(12) United States Patent
McBride et al.

(10) Patent No.: US 10,687,253 B2
(45) Date of Patent: *Jun. 16, 2020

(54) RESOURCE RESERVATION ON NETWORKS COMPRISING WIRELESS AND WIRED SEGMENTS

(71) Applicant: Cisco Technology, Inc., San Jose, CA (US)

(72) Inventors: Michael McBride, Laguna Niguel, CA (US); Subhasri Dhesikan, San Jose, CA (US); Neil Diener, Hudson, OH (US); David S. Stephenson, San Jose, CA (US); Rajneesh Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/700,807

(22) Filed: Sep. 11, 2017

(65) Prior Publication Data

US 2018/0070269 A1 Mar. 8, 2018

Related U.S. Application Data

(63) Continuation of application No. 12/917,846, filed on Nov. 2, 2010, now Pat. No. 9,763,140.

(51) Int. Cl.
*H04W 28/24* (2009.01)
*H04W 28/26* (2009.01)

(52) U.S. Cl.
CPC .......... *H04W 28/24* (2013.01); *H04W 28/26* (2013.01)

(58) Field of Classification Search
None
See application file for complete search history.

(56) References Cited

U.S. PATENT DOCUMENTS

| | | | |
|---|---|---|---|
| 7,126,939 B2 * | 10/2006 | Barany | H04L 29/06027 370/352 |
| 9,763,140 B2 | 9/2017 | McBride et al. | |
| 2003/0093526 A1 * | 5/2003 | Nandagopalan | H04L 29/06027 709/225 |
| 2005/0088977 A1 | 4/2005 | Roch et al. | |

(Continued)

OTHER PUBLICATIONS

P802.1Qat/D6.0, "Draft Standard for Local and Metropolitan Area nteworks—Virtual Bridged Local Area Networks—Amendment XX: Stream Reservation Protocol (SRP)", IEEE 802.1, Apr. 23, 2010 (Year: 2010).*

(Continued)

*Primary Examiner* — Thinh D Tran
(74) *Attorney, Agent, or Firm* — Patterson + Sheridan, LLP (57) ABSTRACT

Described in an example embodiment is an end-to-end admission control system that allows any rich media application to secure admission control in an environment where there are mixed wireless and wired segments in the network. In particular embodiments, the system includes the integration of Add Traffic Stream (ADDTS) and Resource Reservation Protocol (RSVP) admission control mechanisms, the mapping of parameters between these two mechanisms, the admission control policies, and failure handling for the end-to-end resource control.

20 Claims, 7 Drawing Sheets

(56) References Cited

U.S. PATENT DOCUMENTS

| | | | |
|---|---|---|---|
| 2006/0083193 A1* | 4/2006 | Womack | H04W 48/18 370/328 |
| 2006/0218353 A1* | 9/2006 | Livet | H04L 47/724 711/141 |
| 2006/0268824 A1* | 11/2006 | Dhesikan | H04L 29/06027 370/351 |
| 2007/0165610 A1* | 7/2007 | Tseng | H04W 76/10 370/356 |
| 2007/0286117 A1 | 12/2007 | Balasubramanian et al. | |
| 2008/0016556 A1 | 1/2008 | Selignan | |
| 2008/0037567 A1* | 2/2008 | Cho | H04L 12/4625 370/401 |
| 2009/0116478 A1 | 5/2009 | Hurtta et al. | |

OTHER PUBLICATIONS

California Software Labs; Extending End-to-End QoS to WiFi based WLAN; White Papers/Jan. 2007/pp. 1-9.

* cited by examiner

RESOURCE RESERVATION ON NETWORKS COMPRISING WIRELESS AND WIRED SEGMENTS

TECHNICAL FIELD

The present disclosure relates generally to resource reservation for data streams.

BACKGROUND

Enterprise networks may suitably comprise both wireless and wired network segments. This can complicate call admission control (CAC) because wireless segments and wired segments often employ different types of resource reservation (RR) protocols. For example, Resource Reservation Protocol (RSVP) is a layer 3 (as defined by the Open Systems Interconnection or "OSI" reference model) or network layer (L3) protocol employed on wired networks for call admission control and/or data plane Quality of Service (QoS). Add Traffic Stream (ADDTS) is a link layer or layer 2 (L2) protocol employed by wireless networks for call admission control and/or data plane QoS.

BRIEF DESCRIPTION OF THE DRAWINGS

The accompanying drawings incorporated herein and forming a part of the specification illustrate the examples embodiments.

OVERVIEW OF EXAMPLE EMBODIMENTS

The following presents a simplified overview of the example embodiments in order to provide a basic, understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising an interface for communicating with an associated network, and control logic coupled with the interface. The control logic sends a request to establish communications via the interface to an endpoint coupled with the associated network. The control logic receives a response to the request to establish communications via the interface. The control logic sends a first resource reservation request to reserve wireless resources via the interface, and sends a second resource reservation request to the endpoint to reserve network resources to the endpoint. The control logic controller establishes communication with the endpoint responsive to successfully reserving wireless resources and reserving network resources to the endpoint.

In accordance with an example embodiment, there is disclosed herein a method for establishing communications, such as streaming communications employed in telephone, audio, and/or audiovisual communications. A request is sent to establish communications to an endpoint coupled with an associated network. A response to the request is received. A first resource reservation request is sent to reserve wireless resources, and a second resource reservation request is sent to the endpoint to reserve network resources to the endpoint. Communication is established with the endpoint responsive to successfully reserving wireless resources and reserving network resources to the endpoint.

In accordance with an example embodiment, there is disclosed herein, an apparatus comprising a wireless interface, a network interface, and control logic. The control logic is responsive to receiving a resource reservation employing a first protocol to reserve wireless resources from a first endpoint via the wireless interface to send a resource reservation request employing a second protocol via the network interface to a device associated with a second endpoint. The control logic is responsive to receiving a response from the device associated with the second endpoint indicating resources were reserved to send a response to the resource reservation request to the first endpoint indicating wireless resources were reserved.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Example embodiments here describe how end-to-end resource control can be achieved in an environment where L2 (Layer 2 or Link Layer) and L3 (Layer or network layer) networks exist on a path between 2 endpoints. This is done by the integration of Add Traffic Stream (ADDTS) and Resource Reservation Protocol (RSVP).

Described herein, are two methods in which the integration of ADDTS and RSVP can take place. The first method is referred to as Endpoint Integration 2. and the second method is referred to as Network Integration.

In Endpoint integration, an endpoint, such as the calling party of a voice/video call invokes the two admission control mechanisms (wired and wireless, e.g., ADDTS and RSVP) and then ties the results of the two together. In an example embodiment, described herein is a sequence of messages illustrating how ADDTS and RSVP can be interleaved to achieve a proper integration. Resource reservation handling is usually governed by some specific failure handling policies, which are also called as strength tags. Strength tags dictate what should happen to the call if the resource reservation fails. In this case, there are 2 resource reservation mechanisms. An example of an integration of the individual policies to achieve the final policy that should be used with such an end-to-end resource reservation mechanism is described herein.

Another way to integrate ADDTS and RSVP is at the junction of the wired and wireless networks. This method is referred to herein as Network Integration. In Network integration, the endpoint only issues one request. For example, if the endpoint is at the edge of the wireless (e.g., WiFi) network, then the endpoint issues ADDTS reservation request. At the point where the wireless and wired network segments meet, ADDTS is mapped into a RSVP request for performing reservation request in the wired segment of the path. Note that ADDTS can, be uni-directional or bi-directional whereas RSVP is always uni-directional. An example embodiment described herein illustrates call flow sequence that addresses these mismatches and provides a method in which such integration can take place. RSVP message objects are created from the information in the ADDTS messages. In this scenario, the integration of the policies is not at the endpoint but is performed at the edge of the wireless and wired networks.

Figure 1:
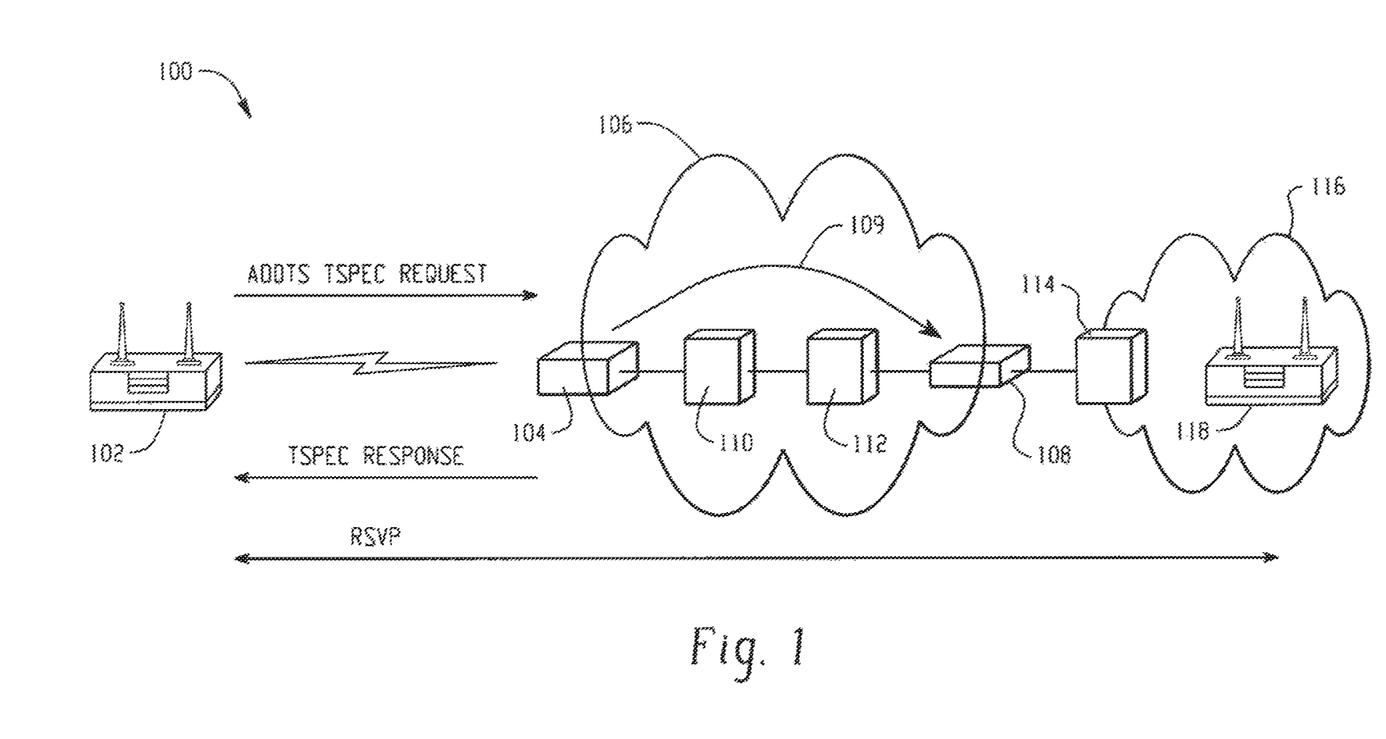
FIG. 1 illustrates an example of a network with wired and wireless segments upon which an example embodiment can be implemented.

FIG. 1 illustrates an example of a network 100 with wired and wireless segments upon which an example embodiment can be implemented. In the illustrated example, an endpoint 102 communicates wirelessly with access point (AP) 104 coupled with network 106.

In particular embodiments, access point 104 is a Lightweight Access Point Protocol (LWAPP) compatible access point and employs a Control and Provisioning of Wireless Access Points (CAPWAP) compatible protocol to communicate with a Wireless Local Area Network Controller (WLC) 108 as illustrated by 109. In these embodiments, AP 104 employs a tunnel to pass packets from AP 104 through switches 110, 112 to WLC 108.

WLC 108 coupled with switch 114 on network 106. A second endpoint 118 is coupled to network 116. The second endpoint may be coupled to network 116 via a wireless and/or wired connection.

In an example embodiment, where endpoint integration is used, endpoint 102 may initiate communications, e.g., streaming communications such as a voice call or a video call to endpoint 118. Endpoint 102 sends a request to establish communications to endpoint 118, for example a Session Initiation Protocol (SIP) INVITE message. Endpoint 102 waits for a response to the request, such as a SIP conditional accept message. In accordance with an example embodiment, a SIP INVITE is sent before resource reservation messages because in a SIP call flow, the offerer (caller) can offer multiple choices for codecs and the answerer selects one; therefore, the bandwidth needed for the call is unknown at the time the offer is made. In the past, the difference in bandwidth between the choices was small, for example for G.711 the bandwidth was 80 kbps (kilobytes per second) and G.729 the bandwidth is about 8 kbps. However, with wideband codecs and video, there may be a substantial difference between various choices. For example, one choice may require 12 MBs (mega-bytes per second) and another choice may be 80 kbps. So if a call requested 12 MBs and the call actually uses 80 kbps, there is a huge over-reservation for the call which may result in the call and/or other calls being rejected while there is actually bandwidth available.

After receiving the conditional accept from endpoint 118, endpoint 102 sends a first request, such as Add Traffic Stream (ADDTS) request, to reserve wireless resources to AP 104. Endpoint 102 also sends a second resource reservation request such as a Resource Reservation Protocol (RSVP) request, to reserve wired network resources to endpoint 118. These requests may be sent in parallel or together. In particular embodiments, endpoint 102 may receive a RSVP request from endpoint 118, and responds to the request.

Upon receiving responses to the first and second resource reservation requests indicating that resources were successfully allocated, communications (e.g., a call or other streaming communications) are established between endpoints 102, 118. In an example embodiment, when endpoint 102 creates a packet to send to endpoint 118, endpoint 102 inputs an appropriate value in a Differentiated Services Code Point (DSCP) field in an Internet Protocol (IP) header within the packet, and inputs an appropriate User Priorities (UP) value in a wireless header within the packet.

In an example embodiment, where CAPWAP compatible protocol is used to communicate between AP 104 and WLC 108, AP 104 in response to receiving a packet from endpoint 102, copies the inner DSCP value to the outer DSCP value in the tunnel header. The packet is forwarded to a switch (e.g. one of switches 110 and/or 112) which route the packet on the network instead of routing the packet to WLC 108. Similarly, when a switch (e.g., switch 110 and/or 112) receives a packet from the destined to endpoint 102 (for example from endpoint 118), the switch copies the DSCP value in the packet to the tunnel header and routes the packet to AP 104. AP 104 de-encapsulates the packet and sends the packet to endpoint 102 with the appropriate User Priorities (UP) value based on the DSCP value.

In an example embodiment, where network integration is employed, endpoint 102 sends a request to establish communications with endpoint 118. For example the request may be a SIP INVITE.

AP 104 receives a resource reservation request on its network port (the port coupled to network 106). Endpoint 118 sends a response, such as a SIP conditional accept for the SIP INVITE. Endpoint 102 sends a request to reserve wireless resources to AP 104. AP 104 in response to receiving the request for wireless resources sends a second request to reserve network resources (wired resources or in the case of a mesh network backhaul resources).

Figure 3:
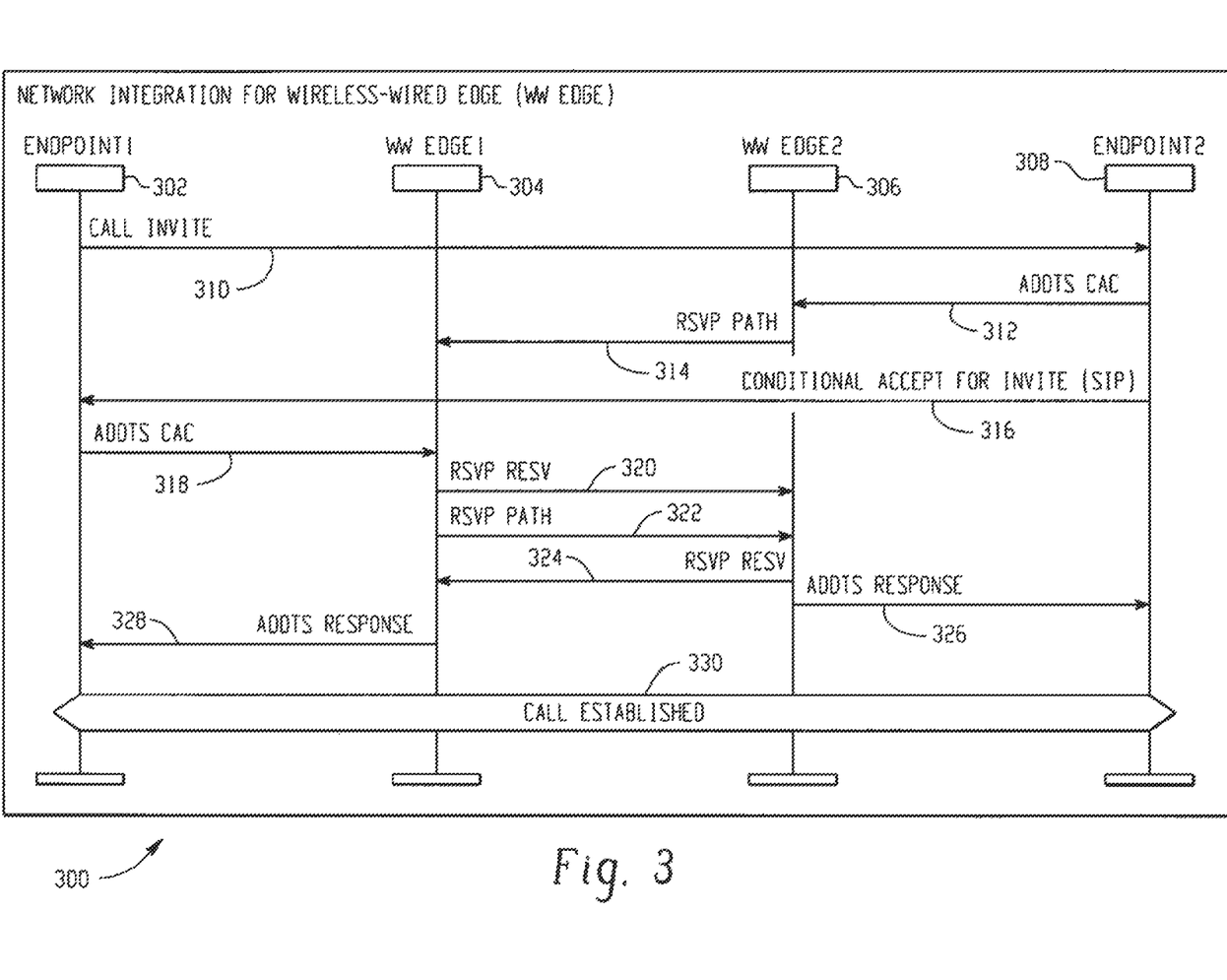
FIG. 3 illustrates an example signal diagram employing network integration for wireless and wired resource reservation.

AP 104 may also receive a request to reserve network resources from a device (for example an AP) associated with endpoint 118 (an example is illustrated in FIG. 3). AP 104 responds to the request.

If the request for resources requested sent by AP 104 is successful, AP 104 responds to the request to reserve wireless resources seat by endpoint 102. At this point, communications, such as a call, is established between endpoints 102, 118.

In an example embodiment, if the request is for a video call or other type of communication that involves multiple streams (such as video and audio), additional requests for wireless and network resources may be employed.

Figure 2:
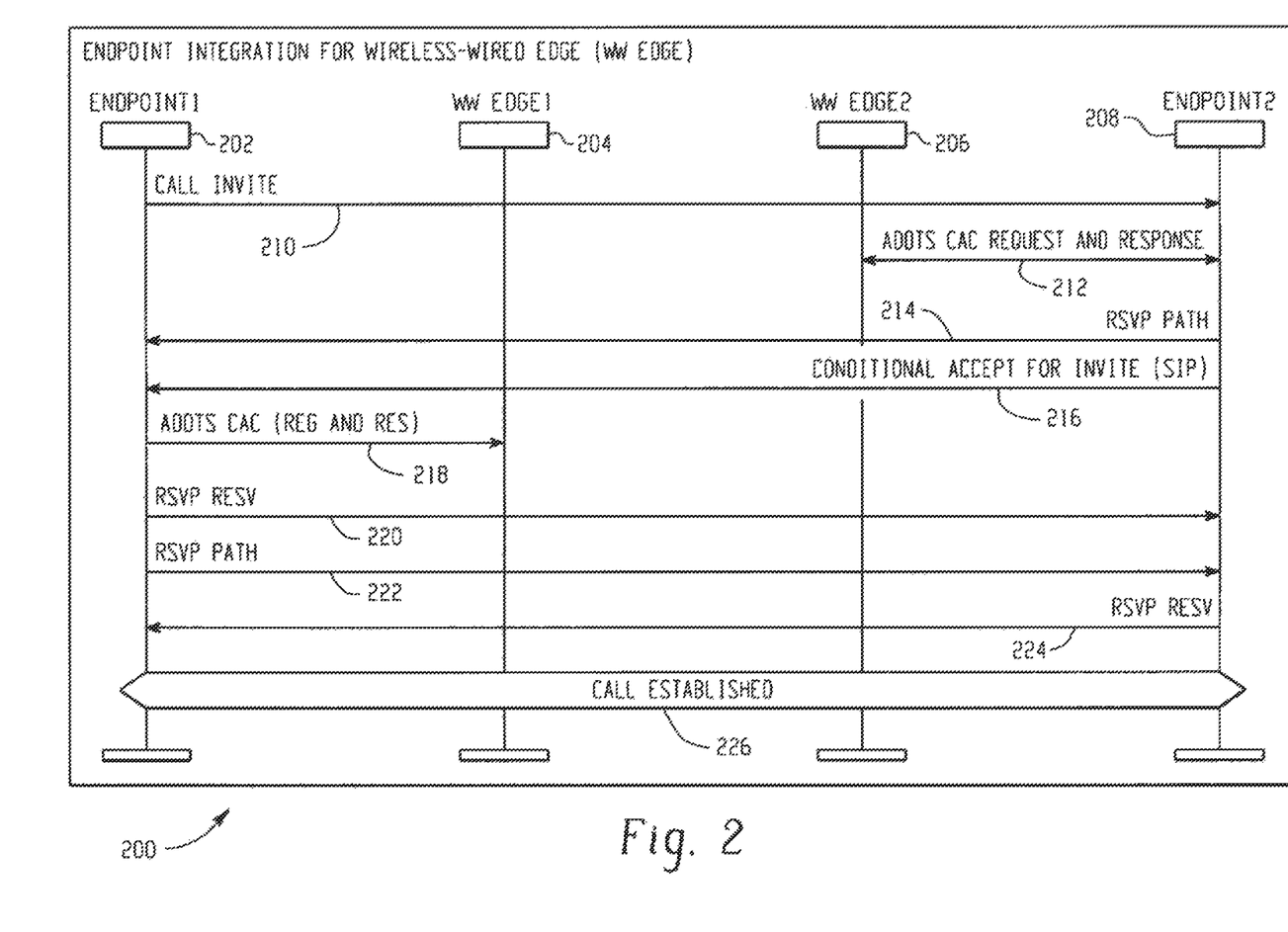
FIG. 2 illustrates an example signal diagram employing endpoint integration for wireless and wired resource reservation.

FIG. 2 illustrates an example signal diagram 200 employing endpoint integration for wireless and wired resource reservation. This example illustrates signals exchanged between endpoints 202, 208 where each endpoint communicates wirelessly with a device 204, 206 respectively, such as an AP for accessing a network; however, those skilled in the art should readily appreciate that the principles illustrated herein are applicable to situations where only one endpoint is coupled with a wireless network. In those embodiments, only the endpoint or endpoints wirelessly coupled to the network would have to reserve wireless resources.

At 210, endpoint 202 initiates communications with endpoint 208 as illustrated by 210. In this example, endpoint 202 sends a SIP INVITE to endpoint 208. Endpoint 212 requests wireless resources from device 206 at the intersection of tree wireless, wired network as illustrated by 212. Endpoint 212 also sends an RSVP Path message as illustrated by 214 to endpoint 202 to reserve network resources. Endpoint 212 also sends a conditional accept for invite (SIP) as illustrated by 216 to endpoint 202.

In response to receiving the conditional accept, as illustrated by 218, endpoint 202 requests (and receives a response) for wireless resources with device 204 at the intersection of the wireless and wired networks. Endpoint 202 also sends a RSVP Resv (Reserve) request to endpoint 208 as illustrated by 220. Endpoint 202 sends a RSVP Path illustrated by 222 to confirm the reservation. Endpoint 202 receives a RSVP Resv from endpoint 208 as illustrated by 224. Upon confirmation that the resources have been reserved, communications (such as a call) is established as illustrated by 226.

FIG. 3 illustrates an example signal diagram 300 employing network integration for wireless and wired resource reservation in accordance with a second example embodiment. This example illustrates signals exchanged between endpoints 302, 308 where each endpoint wirelessly communicates with a device 304, 306 respectively, such as an AP for accessing a network; however, those skilled in the art should readily appreciate that the principles illustrated herein are applicable to situations where only one endpoint is coupled with a wireless network. In those embodiments, only the endpoint or endpoints wirelessly coupled to the network would have to reserve wireless resources.

Endpoint 302 sends a request to establish communications to endpoint 308 as illustrated by 310, which in this example is a SIP INVITE message. Endpoint 308, responsive to receiving the request, sends a resource reservation message (ADDTS in this example) to device 306 at the intersection of the wireless and wired networks as illustrated by 312 to reserve wireless resources. Device 306 sends a message to reserve network resources to device 304, which in this example s a RSVP path message, as illustrated by 314. Endpoint 308 also sends a conditional accept for invite (SIP) to endpoint 302 as illustrated by 316.

Endpoint 302 in response to receiving the conditional acceptance reserves wireless resources by sending a request to reserve wireless resources to device 304 (ADDTS CAC in this example) as illustrated by 818. Device 304, in response to endpoint 302's request to reserve wireless resources, responds to the network resource request (RSVP Path) request sent by device 306 (see RSVP Path 314), which is illustrated in this example as a RSVP RESV 320, and sends a request to reserve network resources (RSVP Path in this example) as illustrated by 322.

Device 306 sends a response to the device 304's request to reserve network resources, illustrated as RSVP RESV 324 in this example, and responds to endpoint 2's request for network resources as illustrated by ADDTS response 326. At this point, if all requests to reserve wireless and wired resources were successful, communications (such as a call) are established between endpoints 302 and 308 as illustrated by 330.

Figure 4:
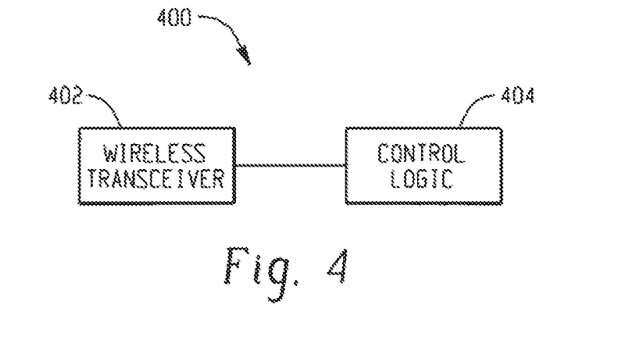
FIG. 4 is a block diagram of an endpoint upon which an example embodiment can be implemented.

FIG. 4 is a block diagram of an endpoint 400 upon which an example embodiment can be implemented. Endpoint 400 is suitable for implementing endpoints 102, 118 (FIG. 1), 202, 208 (FIG. 2), and/or 302, 308 (FIG. 3). Endpoint 400 comprises a wireless transceiver 402 for communicating wirelessly with a network and control logic 404 which performs the functionality described herein, "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

Figure 5:
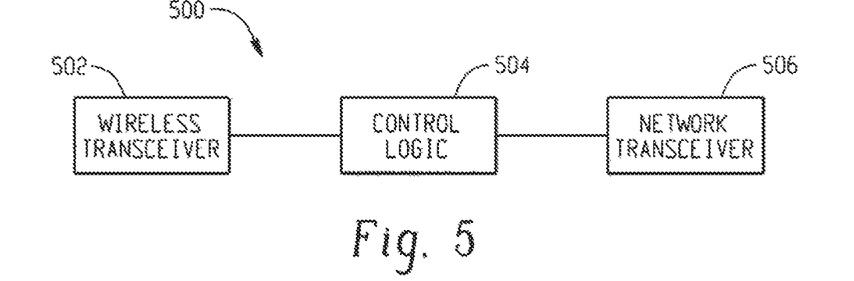
FIG. 5 is a block diagram of a device at the intersection of a wired and wireless network upon which an example embodiment can be implemented.

FIG. 5 is a block diagram of a device, for example an access point, 500 at the intersection of a wired and wireless network upon which an example embodiment can be implemented. Device 500 is suitable implementing AP 104 (FIG. 1), devices 204, 206 (FIG. 2), and/or devices 304, 306 (FIG. 3).

Device 500 comprises a wireless transceiver 502 which can communicate wirelessly with endponts employing a wireless protocol. Control logic 504 implements the functionality described herein. Network transceiver 506 is employed for communicating with an associated network. Network transceiver may be a wired transceiver (such as Ethernet) or a wireless transceiver (such as a backhaul connection in a Mesh network). Network transceiver may be employed to communicate with WLC as illustrated in FIG. 1 employing a CAPWAP protocol.

Figure 6:
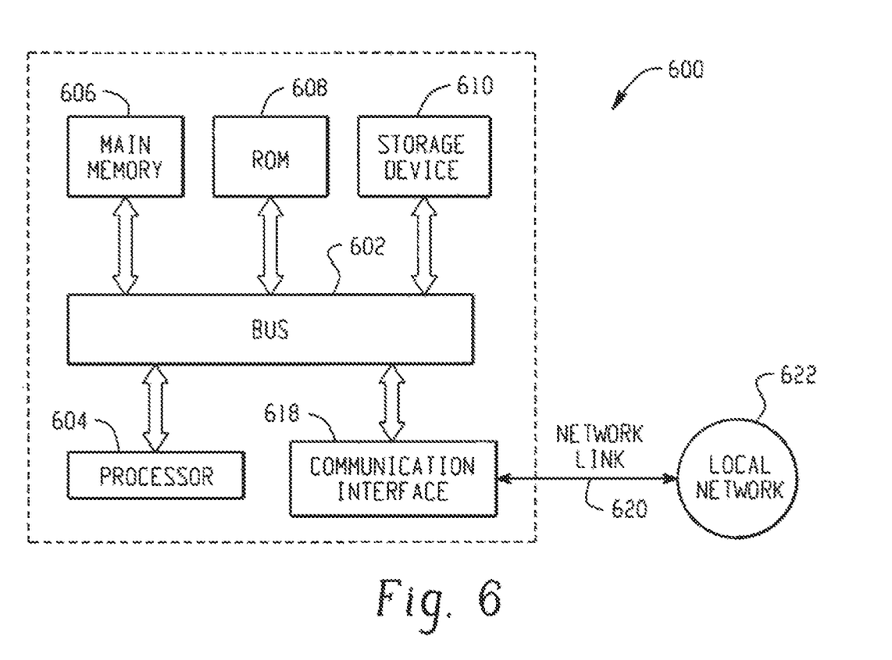
FIG. 6 is a block diagram of a computer system upon which an example embodiment can be implemented.

FIG. 6 is a block diagram of a computer system 600 upon which an example embodiment can be implemented. Computer system can be employed to implement the functionality of endpoints 102, 108 (FIG. 1), AP 104 (FIG. 1), endpoints 202, 208 (FIG. 2), devices 204, 206 (FIG. 2), endpoints 302, 308 (FIG. 3), devices 304, 306 (FIG. 3), control logic 404 (FIG. 4) and/or control logic 504 (FIG. 5).

Computer system 600 includes a bus 602 or other communication mechanism communicating information and, e processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static rage device coupled to bus 602 for storing static information and instructions for processor 604.

A storage device 610, such as a magnetic disk or optical disk, is provided and coupled to bus 602 for storing information and instructions.

An aspect of the example embodiment s related to the use of computer system 600 for stitching Layer 2 (L2) and Layer 3 (L3) resource reservation protocols. According to an example embodiment, stitching L2 and L3 resource reservation protocols is provided by computer system 600 in response to processor 604 executing one or more sequences of one or m ire instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 604 for execution. Such a medium may take many forms, including but not limited to non-volatile media, and volatile media. Non-volatile media include for example optical or magnetic disks, such as storage device 610. Volatile media include dynamic memory such as main memory 606. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606 from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling computer system 600 to a network link 620 that is connected to a local network 622. If computer system 600 is employed to implement an endpoint, communication interface 618 is a wireless transceiver (e.g. wireless transceiver 402 in FIG. 4 or wireless transceiver 502 in FIG. 5). If computer system 600 is employed to implement an access point (for example AP 104 in FIG. 1 or any of the devices at the intersection of the wireless and wireless networks such as devices 204, 206 (FIG. 2) and/or devices 304, 306 (FIG. 3)), an additional communication interface is employed, where one communication interface functions as network transceiver 506 (FIG. 5) and the second communication interface 618 functions as wireless transceiver 502 (FIG. 5).

In view of the foregoing structural and functional features described above, methodologies in accordance with example embodiments will be better appreciated with reference to FIGS. 7-10. While, for purposes of simplicity of explanation, the methodologies of FIGS. 7-10 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement the methodologies described herein. The methodologies described herein are suitably adapted to be implemented in hardware, software, or a combination thereof such as a processor executing software.

Figure 7:
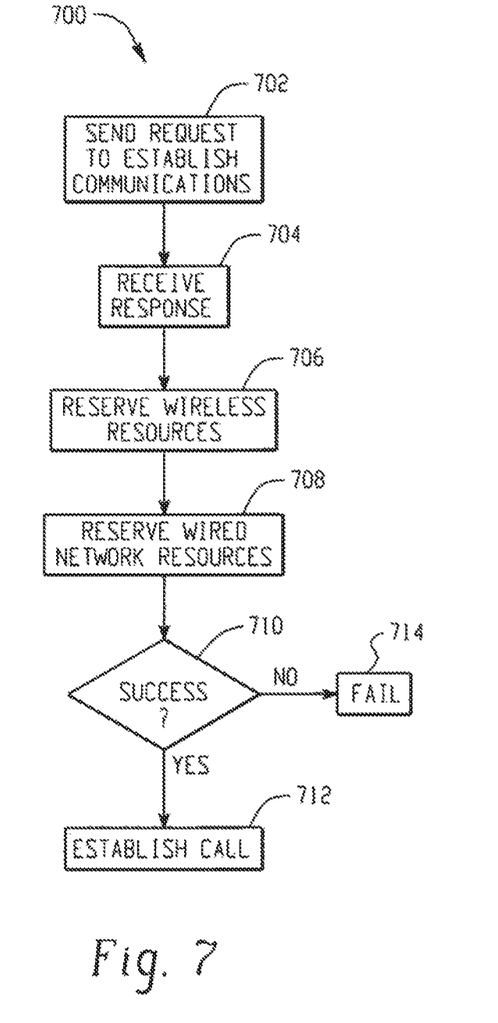
FIG. 7 is a block diagram illustrating an example of a methodology for endpoint integration.

FIG. 7 is a block diagram illustrating an example of a methodology 700 for endpoint integration. Methodology 700 may be implemented by endpoints 102, 118 (FIG. 1), endpoints 202, 208 (FIG. 2), endpoints 302, 308 (FIG. 3), control logic 404 (FIG. 4), and/or processor 604 (FIG. 6).

At 702, a request is sent to establish communications with another endpoint. For example, the request may be a SIP INVITE message.

At 704, a response is received to the request. The response may be a conditional response, such as a SIP conditional acceptance message.

At 706, wireless resources are reserved. In an example embodiment, wireless resources are reserved by sending an ADDTS message to an associated access point.

At 708, resources on the wired network are reserved on the path to the destination endpoint. In an example embodiment a RSVP Path message is sent.

At 710, a determination is made whether the wireless and wired resources required for the communication were successfully reserved. If successful (YES), the communications (for example a call) is established as illustrated at 712. If one of the resources could not be reserved, e.g., the wired resources, wireless resources, or both wired and wireless resources, could not be reserved the a failure condition will apply as illustrated at 714. The endpoint may take any appropriate action in response to a failure such as retrying after a predetermined time period or retrying a specified number of times, or providing an output indicating communications could not be established.

Figure 8:
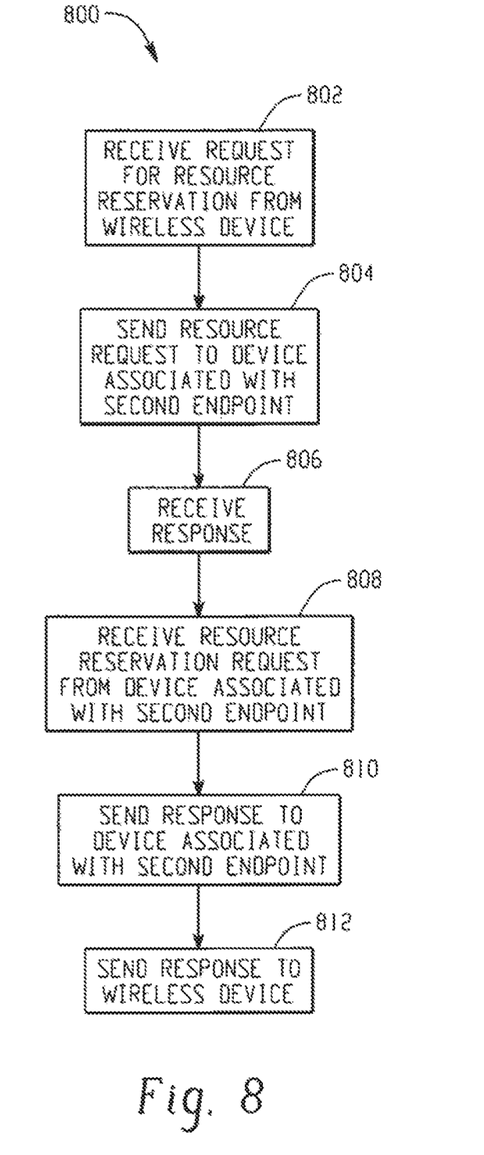
FIG. 8 is a block diagram illustrating an example of a methodology for integration.

FIG. 8 is a block diagram illustrating an example of a methodology 800 for network integration. Methodology 800 may be implemented by AP 104 (FIG. 1), devices 204, 206 (FIG. 2), devices 304, 306 (FIG. 3), control logic 504 (FIG. 5) and/or processor 604 (FIG. 6).

At 802, a request to reserve resources is received from a wireless device. The request is to reserve resources to communicate with a second endpoint. In an example embodiment, the request is a ADDTS request.

At 804 a request to reserve resources is sent across the network on a path towards the second endpoint. In an example embodiment, the request is a RSVP Path message. If the second endpoint is coupled wirelessly with an AP, the request may be directed to the AP.

At 806, a response to the request to reserve resources on the network is received. For example, the response may be a RSVP Resv message.

At 808, a resource reservation request is received from a device associated with the second endpoint. In particular embodiments, the request is received from the second endpoint. The request may be in the form of a RSVP Path message. Since RSVP is a unidirectional protocol, the request could be employed to reserve resources for a stream (such as audio, video, or both) from the second endpoint to the wireless device.

At 810, a response to the resource reservation request received from the device associated with the second endpoint is sent. In an example embodiment, the response is a RSVP Resv message.

At 812, a response to the request for wireless resources is sent to the wireless device. At this point, wireless and wired resources have been reserve and communications can begin. If 8098 and 810 were included, the communications may be bi-directional.

Figure 9:
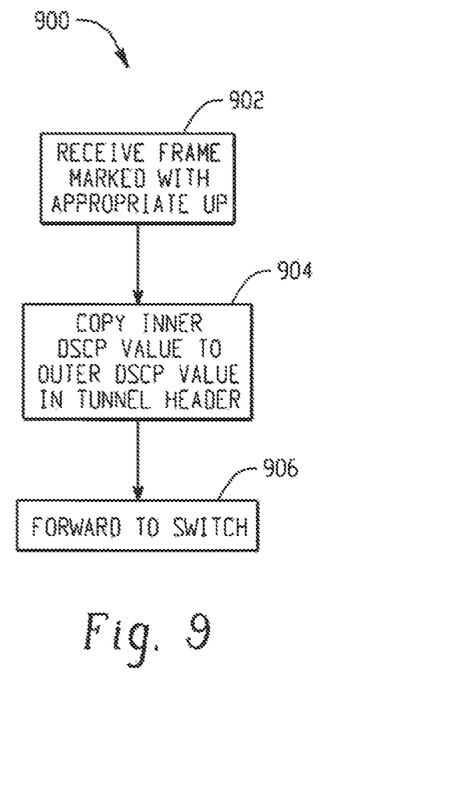
FIG. 9 is a block diagram illustrating an example of a methodology for handling a frame received from a wireless endpoint on a network employing a Control and Provisioning of Wireless Access Points (CAPWAP) compatible protocol.

FIG. 9 is a block diagram illustrating an example of methodology 900 for handling a frame received from a wireless endpoint on a network employing a Control and Provisioning of Wireless Access Points (CAPWAP) compatible protocol. In this example, the frame is destined for a second endpoint that is in communication with the wireless endpoint.

At 902, the packet is received. The packet comprises a frame that is marked with a value stored in the User Priorities (UP) field in the header of the wireless packet (for example a WiFi header).

At 904, a tunnel encapsulation header is applied to the frame. The inner DSCP value is copied off the outer DSCP value in the tunnel header.

At 906, the packet is forwarded to the switch. In an example embodiment, the switch removes the tunnel header which exposes the original IP header in the packet. The switch then sends the packet onto the wired network with the original DSCP value from the original IP header.

Figure 10:
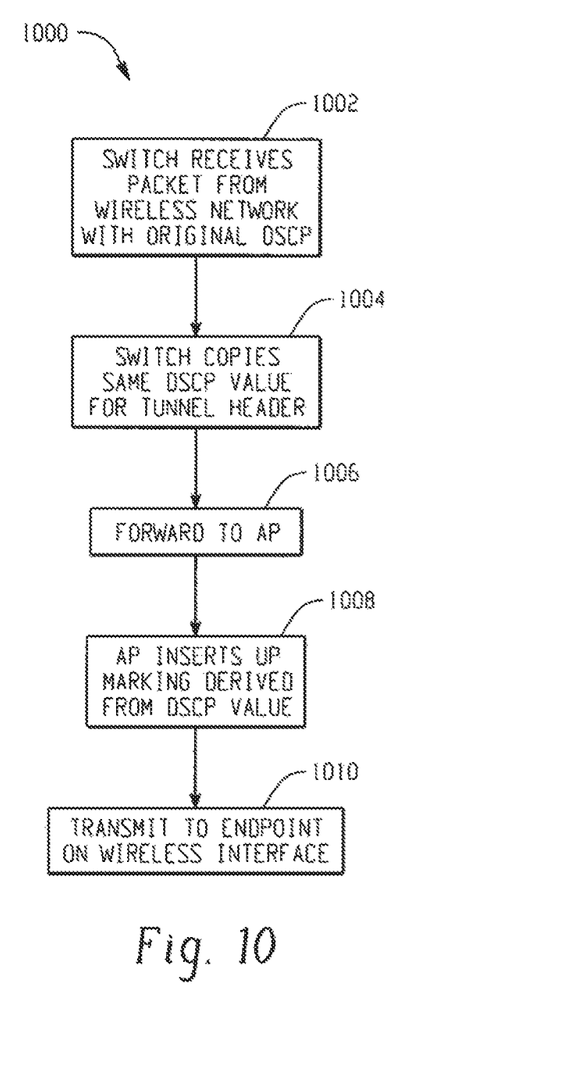
FIG. 10 is a block diagram illustrating an example of a methodology for handling a frame received from a network destined for a wireless endpoint on a network employing a CAPWAP compatible protocol.

FIG. 10 is a block diagram illustrating an example of a methodology 1000 for handling a frame received from a network destined for a wireless endpoint on a network employing a CAPWAP compatible protocol.

At 1002, a switched on the wired network associated with an access point receives a packet from the wireless network. The packet has an original DSCP value in the IP header.

At 1004, the switch copies the same DSCP value from the IP header into a tunnel header. The tunnel header is used to send the packet directly to the AP instead of to a WLC associated with the AP (see for example FIG. 11).

At 1006, the switch forwards the packet to the AP. As mentioned in the preceding paragraph, the packet bypasses the WLC.

At 1008, the AP removes the tunnel header and inserts a wireless header onto the packet. The UP value in the wireless header is derived from the DSCP value.

At 1010, the AP transmits the packet to the endpoint via the wireless endpoint. The packet is put into the appropriate transmit queue based on the UP value derived from the DSCP value.

Figure 11:
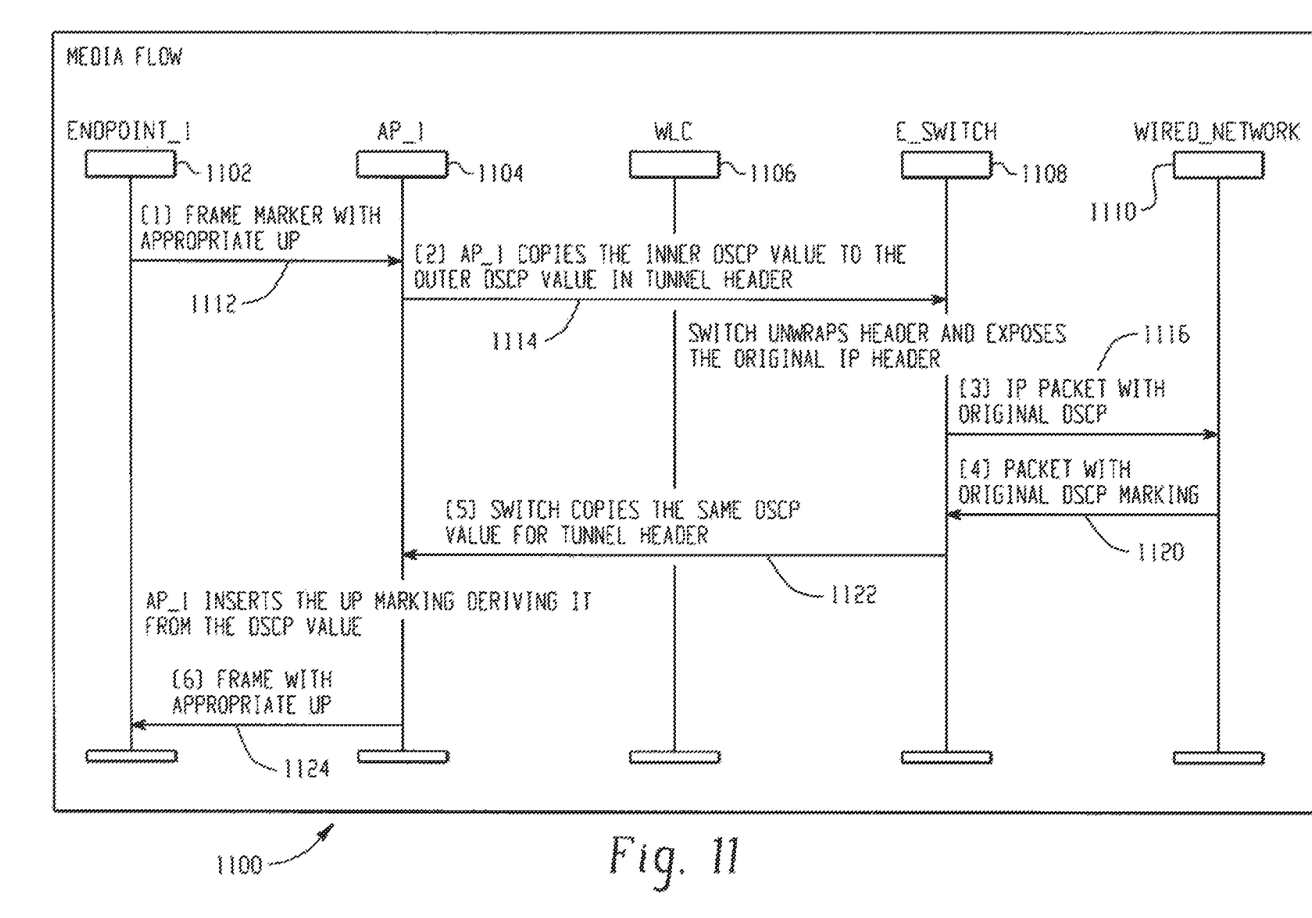
FIG. 11 illustrates an example signal diagram illustrating how packets are handled in network environment employing a CAPWAP compatible protocol.

FIG. 11 illustrates an example signal diagram 1100 illustrating how packets are handled in network environments employing a CAPWAP compatible protocol. When the endpoint originates the packet, the media is marked with the appropriate DSCP value in the IP header (for the wired segment) and with the required UP value in the WiFi header for the wireless segment).

When the frame is processed in the AP, the UP value in the WiFi header is used to provide QoS. In many wireless deployments, there is a tunnel (CAPWAP) between the AP and the WLC. In the CAPWAP tunnel, there is outer IP header, whose DSCP value is used for providing QoS in the tunnel. With upstream data, this DSCP is inserted by the AP. The AP should use the value from the inner IP header rather than deriving it from the UP because UP has only 8 values whereas there are 64 values in DSCP, thus some resolution is lost when converting from a UP to a DSCP.

Once the media leaves the tunnel, it is treated by it's UP until it hits the wired edge. At the wired entry point (Ethernet switch) the original DSCP inserted by the endpoint is exposed and used for providing QoS in the layer 3 segment. Table 1 below illustrates an example of parameter mappings between WiFi Multimedia (WMM) Traffic Specification (TSPEC) parameters and RSVP TSPEC parameters.

TABLE 1

| WMM TSPEC Parameter | RSVP TSPEC Parameter |
| --- | --- |
| User priority | Mapped from Service header: service number |
| Nominal MSDU Size | no corresponding parameter |
| Maximum MSDU Size | Maximum Packet Size (parameter "M") |
| Minimum Service Interval | n/a |
| Maximum Service Interval | n/a |
| Inactivity Interval | no corresponding parameter |
| Suspension Interval | n/a |
| Service Start Time | n/a |
| Minimum Data Rate | no corresponding parameter |
| Mean Data Rate | Token Bucket Rate (parameter "r") or Rate (parameter "R") |
| Peak Data Rate | Peak Data Rate (parameter "p") - except this should be left blank if it represents the PHY line rate or positive infinity. |
| Burst Size | Token Bucket Size (parameter "b") |
| Delay Bound | n/a |
| Minimum PHY Rate | n/a |
| Surplus Bandwidth Allowance | n/a |
| Medium Time | n/a |
| no corresponding parameter | Minimum policed unit (parameter "m") |
| no corresponding parameter | Slack Term (parameter "S") |

The example in FIG. 11 illustrates an example of packets traveling between endpoints on a network with a CAPWAP tunnel coupling an AP with a WLC. 1112, 1114, and 1116 illustrate an example of packet processing for a packet transmitted by wireless device that is to be routed onto a wired network to the second endpoint. As illustrated by 1112, a packet is n from endpoint 1102 to AP 1104. The frame is marked with a UP value and with a DSCP value.

AP 1104 encapsulates the frame with a tunnel header and copies the inner DSCP value to the encapsulation header. As illustrated by 1114, the frame is sent to switch 1108, not WLC 1106, even though there is a CAPWAP tunnel between AP 1104 and WLC 1106.

Switch 1108 removes the tunnel header and exposes the original IP header in the packet. Switch 1108 then transmits the packet onto wired network 1110 as illustrated at 1116. The packet is transmitted with the original IP header with the original DSCP value.

1120, 1122, and 1124 illustrate an example of a packet from a second endpoint received via the wired network that is to be transmitted wirelessly to the first endpoint. A packet is r received by switch 1108 from wired network 1110 as illustrated by 1116. In this example, the packet is an IP packet with an original DSCP value.

The switch then encapsulates the packet with a tunnel header and copies the original DSCP value into the tunnel header. The packet is sent to AP 1104 as illustrated by 1122.

AP 1104 removes the tunnel header. AP 1104 encapsulates the packet with a wireless network (e.g., WiFi) header for transmission onto the wireless network to endpoint 1102. AP 1104 derives the UP value for the WiFi header derived from the DSCP. The packet is transmitted to endpoint 1102 with the appropriate UP as illustrated by 1124.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitable entitled.

The invention claimed is:

1. An apparatus to integrate admission control mechanisms for different layers in order to permit end-to-end resource reservation for a network having mixed wireless and wired segments, the apparatus comprising:
   one or more computer processors;
   an interface to operatively communicate with a network having mixed wireless and wired segments; and
   control logic operatively connected to the interface and which, when executed by the one or more computer processors, performs an operation comprising:
      sending, by the apparatus as a source endpoint, a request to establish communications with a target endpoint, wherein the source and target endpoints are operatively connected via a single path traversing the mixed wireless and wired segments of the network;
      wherein the target endpoint is configured to, upon receiving the request, send a wireless resource reservation request to a target edge device and receive a reply from the target edge device, whereupon the target endpoint is further configured to send, to the source endpoint, a wired resource reservation request and a response to the request to establish communications;
      subsequent to receiving the response, sending, to a source edge device, an Add Traffic Stream (ADDTS) call admission control (CAC) request using a link layer protocol in order to reserve wireless resources of a wireless segment of the network having the mixed wireless and wired segments, whereupon the source edge device is configured to send, to the source endpoint, an ADDTS CAC response;
      subsequent to receiving the ADDTS CAC response, sending resource reservation protocol (RSVP) reserve and path messages using a network layer protocol to the target endpoint in order to reserve wired network resources of a wired segment of the network having the mixed wireless and wired segments; and
      upon determining successful reservation of both the wireless resources and the wired network resources, establishing communication between the source and target endpoints via the network;
      wherein admission control mechanisms for different layers are integrated in order to permit end-to-end resource reservation for the network having the mixed wireless and wired segments.

2. The apparatus set forth in claim 1, wherein the request to establish communications sent by the control logic comprises a Session Initiation Protocol (SIP) invite message.

3. The apparatus set forth in claim 1, wherein the control logic establishes the communication between the source and target endpoints via both a wireless segment and wired segment of the network responsive to successfully reserving the wireless and wired network resources.

4. The apparatus set forth in claim 1, wherein the control logic creates a packet to transmit to the target endpoint after establishing communications;
   wherein the control logic inputs an appropriate value in a Differentiated Services Code Point (DSCP) field in an Internet Protocol (IP) header within the packet; and
   wherein the control logic inputs an appropriate User Priorities (UP) value in a wireless header within the packet.

5. The apparatus of claim 1, wherein the wireless resource reservation request comprises at least one ADDTS traffic specification message, wherein the wired resource reservation request comprises at least one RSVP path message.

6. The apparatus of claim 1, wherein each of the source and target edge devices comprises a respective edge router, each edge router of which comprises a respective wireless access point at a respective intersection of the wireless and wired segments of the network.

7. The apparatus of claim 1, wherein the operation further comprises:
   upon determining that the reservation of wireless resources and the reservation of the wired network resources did not both successfully complete, performing a predetermined action comprising at least one of: (i) reattempting reservation after a predefined time period elapsing; (ii) reattempting reservation up to a predefined count of attempts; and (iii) outputting an indication that communications could not be established between the source and target endpoints via the network.

8. A computer-implemented method to integrate admission control mechanisms for different layers in order to permit end-to-end resource reservation for a network having mixed wireless and wired segments, the computer-implemented method comprising:
   sending, by as a source endpoint, a request to establish communications with a target endpoint, wherein the source and target endpoints are operatively connected via a single path traversing the mixed wireless and wired segments of the network;
   wherein the target endpoint is configured to, upon receiving the request, send a wireless resource reservation request to a target edge device and receive a reply from the target edge device, whereupon the target endpoint is further configured to send, to the source endpoint, a wired resource reservation request and a response to the request to establish communications;
   subsequent to receiving the response, sending, to a source edge device, an Add Traffic Stream (ADDTS) call admission control (CAC) request using a link layer protocol in order to reserve wireless resources of a wireless segment of the network having the mixed wireless and wired segments, whereupon the source edge device is configured to send, to the source endpoint, an ADDTS CAC response;
   subsequent to receiving the ADDTS CAC response, sending resource reservation protocol (RSVP) reserve and path messages using a network layer protocol to the target endpoint in order to reserve wired network resources of a wired segment of the network having the mixed wireless and wired segments; and upon determining, by operation of one or more computer processors, successful reservation of both the wireless resources and the wired network resources, establishing communication between the source and target endpoints via the network;

wherein admission control mechanisms for different layers are integrated in order to permit end-to-end resource reservation for the network having the mixed wireless and wired segments.

9. The computer-implemented method of claim 8, wherein the request to establish communications comprises a Session Initiation Protocol (SIP) invite message.

10. The computer-implemented method of claim 9, wherein the response to the request to establish communications is a SIP conditional accept message.

11. The computer-implemented method of claim 8, further comprising:

receiving an indication of successful reservation of the wireless resources; and receiving an indication of successful reservation of the network resources.

12. The computer-implemented method of claim 8, wherein the wireless resource reservation request comprises at least one ADDTS CAC request, wherein the wired resource reservation request comprises at least one RSVP path message, wherein the computer-implemented method further comprises:

upon determining that the reservation of wireless resources and the reservation of the wired network resources did not both successfully complete, performing a predetermined action comprising, in respective instances: (i) reattempting reservation after a predefined time period elapsing; (ii) reattempting reservation up to a predefined count of attempts; and (iii) outputting an indication that communications could not be established between the source and target endpoints via the network.

13. The computer-implemented method of claim 12, further comprising:

receiving an indication of successful reservation of the wireless resources; and receiving an indication of successful reservation of the wired network resources;

wherein the request to establish communications comprises a Session Initiation Protocol (SIP) invite message, wherein the response to the request to establish communications is a SIP conditional accept message, wherein the computer-implemented method is performed by a program, wherein the program creates a packet to transmit to the target endpoint after establishing communications;

wherein the program inputs an appropriate value in a Differentiated Services Code Point (DSCP) field in an Internet Protocol (IP) header within the packet, wherein the program inputs an appropriate User Priorities (UP) value in a wireless header within the packet.

14. The computer-implemented method of claim 13, wherein each of the source and target edge devices comprises a respective edge router, each edge router of which comprises a respective wireless access point at a respective intersection of the wireless and wired segments of the network, each wireless access point of which is configured to map ADDTS messages into RSVP requests for resource reservation in the wired segment of the network, including mapping between wireless multimedia (WMM) Traffic Specification (TSPEC) parameters and RSVP TSPEC parameters.

15. The computer-implemented method of claim 14, wherein the source edge device includes a wireless interface and further includes a network interface operatively connected to: (i) a switch and (ii) a Wireless Local Area Network Control logic (WLC); wherein the source edge device further includes control logic that communicates with the WLC employing a Control and Provisioning of Wireless Access Points (CAPWAP) protocol; wherein the control logic of the source edge device forwards, to the switch, packets received via the wireless interface of the source edge device, wherein each ADDTS traffic specification message comprises a respective ADDTS CAC request, wherein each of the reply and the ADDTS CAC response comprises a respective ADDTS CAC response.

16. The computer-implemented method of claim 15, wherein the control logic of the source edge device further:

copies the value in the DSCP field to an outer tunnel header field before forwarding the packet to the switch;

receives a packet from the target edge device, the packet having a value in a DSCP field in an IP header;

adds a wireless header to the packet, the wireless header having a UP field;

derives a value for the UP field based on the DSCP field and store the derived value in the UP field; and after storing the derived value in the UP field, forwards the packet to the source endpoint via the wireless interface.

17. The computer-implemented method of claim 8, wherein the wireless resource reservation request comprises at least one ADDTS CAC request.

18. The computer-implemented method of claim 8, wherein the wired resource reservation request comprises at least one RSVP path message.

19. The computer-implemented method of claim 8, wherein each of the source and target edge devices comprises a respective edge router, each edge router of which comprises a respective wireless access point at a respective intersection of the wireless and wired segments of the network.

20. A non-transitory computer-readable medium containing a program executable to perform an operation to integrate admission control mechanisms for different layers in order to permit end-to-end resource reservation for a network having mixed wireless and wired segments, the operation comprising:

sending, by a source endpoint, a request to establish communications with a target endpoint, wherein the source and target endpoints are operatively connected via a single path traversing the mixed wireless and wired segments of the network;

wherein the target endpoint is configured to, upon receiving the request, send a wireless resource reservation request to a target edge device and receive a reply from the target edge device, whereupon the target endpoint is further configured to send, to the source endpoint, a wired resource reservation request and a response to the request to establish communications;

subsequent to receiving the response, sending, to a source edge device, an Add Traffic Stream (ADDTS) call admission control (CAC) request using a link layer protocol in order to reserve wireless resources of a wireless segment of the network having the mixed wireless and wired segments, whereupon the source edge device is configured to send, to the source endpoint, an ADDTS CAC response;

subsequent to receiving the ADDTS CAC response, sending resource reservation protocol (RSVP) reserve and path messages using a network layer protocol to the target endpoint in order to reserve wired network resources of a wired segment of the network having the mixed wireless and wired segments; and upon determining, by operation of one or more computer processors when executing the program, successful reservation of both the wireless resources and the wired network resources, establishing communication between the source and target endpoints via the network;

wherein admission control mechanisms for different layers are integrated in order to permit end-to-end resource reservation for the network having the mixed wireless and wired segments.

\* \* \* \* \*

UNITED STATES PATENT AND TRADEMARK OFFICE
CERTIFICATE OF CORRECTION

| | |
|---|---|
| PATENT NO. | : 10,687,253 B2 |
| APPLICATION NO. | : 15/700807 |
| DATED | : June 16, 2020 |
| INVENTOR(S) | : Michael McBride et al. |

It is certified that error appears in the above-identified patent and that said Letters Patent is hereby corrected as shown below:

On the Title Page

Item (56), in Column 2, under "Other Publications", Line 2, delete "nteworks" and insert -- networks --, therefor.

In the Drawings

On Sheet 2 of 7, in Figure 2, reference numeral 212, Line 1, delete "ADOTS" and insert -- ADDTS --, therefor.

In the Specification

In Column 1, Line 29, delete "embodiments," and insert -- embodiments. --, therefor.

In Column 1, Line 49, after "for" insert -- network --.

In Column 1, Line 60, delete "environment" and insert -- environments --, therefor.

In Column 1, Line 66, delete "basic," and insert -- basic --, therefor.

In Column 2, Line 64, after "Layer" insert -- 3 --.

In Column 3, Line 1, delete "herein," and insert -- herein --, therefor.

In Column 3, Line 5, delete "integration," and insert -- Integration, --, therefor.

In Column 3, Lines 22-23, delete "integration," and insert -- Integration, --, therefor.

In Column 3, Line 29, delete "can," and insert -- can --, therefor.

Signed and Sealed this
Twenty-ninth Day of September, 2020

Andrei Iancu
*Director of the United States Patent and Trademark Office*

CERTIFICATE OF CORRECTION (continued)
U.S. Pat. No. 10,687,253 B2

In Column 3, Line 51, after "108" insert -- is --.

In Column 4, Line 33, after "where" insert -- a --.

In Column 4, Line 65, delete "seat" and insert -- sent --, therefor.

In Column 5, Line 21, delete "tree" and insert -- the --, therefor.

In Column 5, Line 57, delete "s" and insert -- is --, therefor.

In Column 5, Line 63, delete "818." and insert -- 318. --, therefor.

In Column 6, Line 17, delete "herein," and insert -- herein. --, therefor.

In Column 6, Line 35, after "suitable" insert -- for --.

In Column 6, Line 39, delete "endponts" and insert -- endpoints --, therefor.

In Column 6, Line 46, after "with" insert -- a --.

In Column 6, Line 54, delete "(FIG. 4)" and insert -- (FIG. 4), --, therefor.

In Column 6, Line 56, after "mechanism" insert -- for --.

In Column 6, Line 56, delete "and, e" and insert -- and a --, therefor.

In Column 6, Line 66, delete "rage" and insert -- storage --, therefor.

In Column 7, Line 4, delete "s" and insert -- is --, therefor.

In Column 7, Line 10, delete "m ire" and insert -- more --, therefor.

In Column 8, Lines 33-34, delete "embodiment" and insert -- embodiment, --, therefor.

In Column 8, Line 41, delete "the a" and insert -- a --, therefor.

In Column 8, Line 56, delete "804" and insert -- 804, --, therefor.

In Column 9, Line 11, delete "reserve" and insert -- reserved --, therefor.

In Column 9, Line 14, after "of" insert -- a --.

In Column 9, Line 41, after "The" delete "tunnel".

In Column 9, Line 60, delete "for" and insert -- (for --, therefor.

CERTIFICATE OF CORRECTION (continued)
U.S. Pat. No. 10,687,253 B2

In Column 9, Line 64, after "is" insert -- an --.

In Column 10, Line 48, after "by" insert -- a --.

In Column 10, Line 50, delete "n" and insert -- sent --, therefor.

In Column 10, Line 65, after "is" delete "r".

In Column 11, Line 19, delete "equitable" and insert -- equitably --, therefor.

In the Claims

In Column 12, Line 44, in Claim 8, after "by" delete "as".